US008423010B1

(12) United States Patent
Lee et al.

(10) Patent No.: US 8,423,010 B1
(45) Date of Patent: Apr. 16, 2013

(54) REMOTE ACTIVATION OF A COMMUNICATION-FORWARDING FUNCTION FOR A MOBILE-COMMUNICATION DEVICE

(75) Inventors: Woo Jae Lee, Manhattan, KS (US); Shahruam Fattaahi, Leawood, KS (US); Sanjay K. Sharma, Olathe, KS (US); Peter Syromiatnikov, Overland Park, KS (US); Pujan Roka, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1373 days.

(21) Appl. No.: 11/846,963

(22) Filed: Aug. 29, 2007

(51) Int. Cl.
*H04M 3/00* (2006.01)
(52) U.S. Cl.
USPC .......................................... 455/419; 455/420
(58) Field of Classification Search .................. 455/419, 455/420
See application file for complete search history.

(56) References Cited

U.S. PATENT DOCUMENTS

| 2006/0031340 | A1* | 2/2006 | Mathew et al. | 709/206 |
| 2007/0037571 | A1* | 2/2007 | Begeja et al. | 455/426.1 |
| 2007/0190995 | A1* | 8/2007 | Wang et al. | 455/419 |

OTHER PUBLICATIONS http://www.soft32.com/download_159064.html.

* cited by examiner

*Primary Examiner* — Kamran Afshar
*Assistant Examiner* — Omoniyi Obayanju

(57) ABSTRACT

One or more computer readable media, that enable a method for remotely activating one or more communication-forwarding functions for a mobile-communication device are provided. The present invention allows a forwarding service operated by a provider of mobile communication services and a forwarding application that runs on a mobile communication device to be remotely activated by a user that does not have possession of the mobile communication device. The mobile communication device receives an activation message with instructions to automatically activate a communication-forwarding function. In response to the activation message the mobile communication device activates the requested communication-forwarding function in conformity with the instructions in the activation message. The activation message is generated and sent by an activation-message generator.

14 Claims, 4 Drawing Sheets

REMOTE ACTIVATION OF A COMMUNICATION-FORWARDING FUNCTION FOR A MOBILE-COMMUNICATION DEVICE

BACKGROUND

Many providers of mobile phone service offer a call-forwarding service to their customers. These call-forwarding services may be activated by calling an automated activation service from the mobile phone and providing the required information. Once activated, the call-forwarding service operates independently of the mobile phone. Phone calls are forwarded to the designated number utilizing only network components and infrastructure provided by the mobile phone service company. The call-forwarding service continues to operate until it is deactivated. The service may be deactivated by calling a designated number from the mobile phone.

A drawback of currently offered call forwarding services is that they require the user to have possession of the mobile phone to use the automated activation service, which activates and deactivates call forwarding. A user of a mobile phone may want to activate a call forwarding service when they do not have possession of the phone. For example, if a user inadvertently leaves a mobile phone at home they may want to forward the calls to a work number, but would be unable to activate the service through the automated activation service without the mobile phone. Additionally, the current services only forward phone calls and do not forward other communication types such as instant messages.

SUMMARY

The present invention is defined by the claims below. Embodiments of the present invention provide a system and method for remotely activating two communication-forwarding functions for a mobile-communication device. The first communication-forwarding function that may be remotely activated is a forwarding service operated by a provider of mobile communication services. The second communication-forwarding function that may be remotely activated is a forwarding application operated by a mobile communication device. Embodiments of the present invention have several practical applications in the technical arts including allowing a user of a mobile communication device to activate a communication-forwarding function for the device when the user does not have possession of his or her mobile-communication device.

In a first illustrative aspect, a mobile-communication-device user may send an activation message to the device via a wireless network. In response to the message, the device may contact a designated service provider and activate a forwarding service provided by the service provider, apart from the mobile communication device.

In another illustrative aspect, a mobile-communication-device user may send an activation message to the device via a wireless network. In response to the message, the device may activate a forwarding application running on the mobile communication device.

In a final illustrative aspect, an activation-message generator may generate an activation message and send it to a mobile communication device. The activation message contains instructions to activate or deactivate a communication-forwarding function. In response to the activation message, the mobile communication device activates or deactivate a communication-forwarding function

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1A:
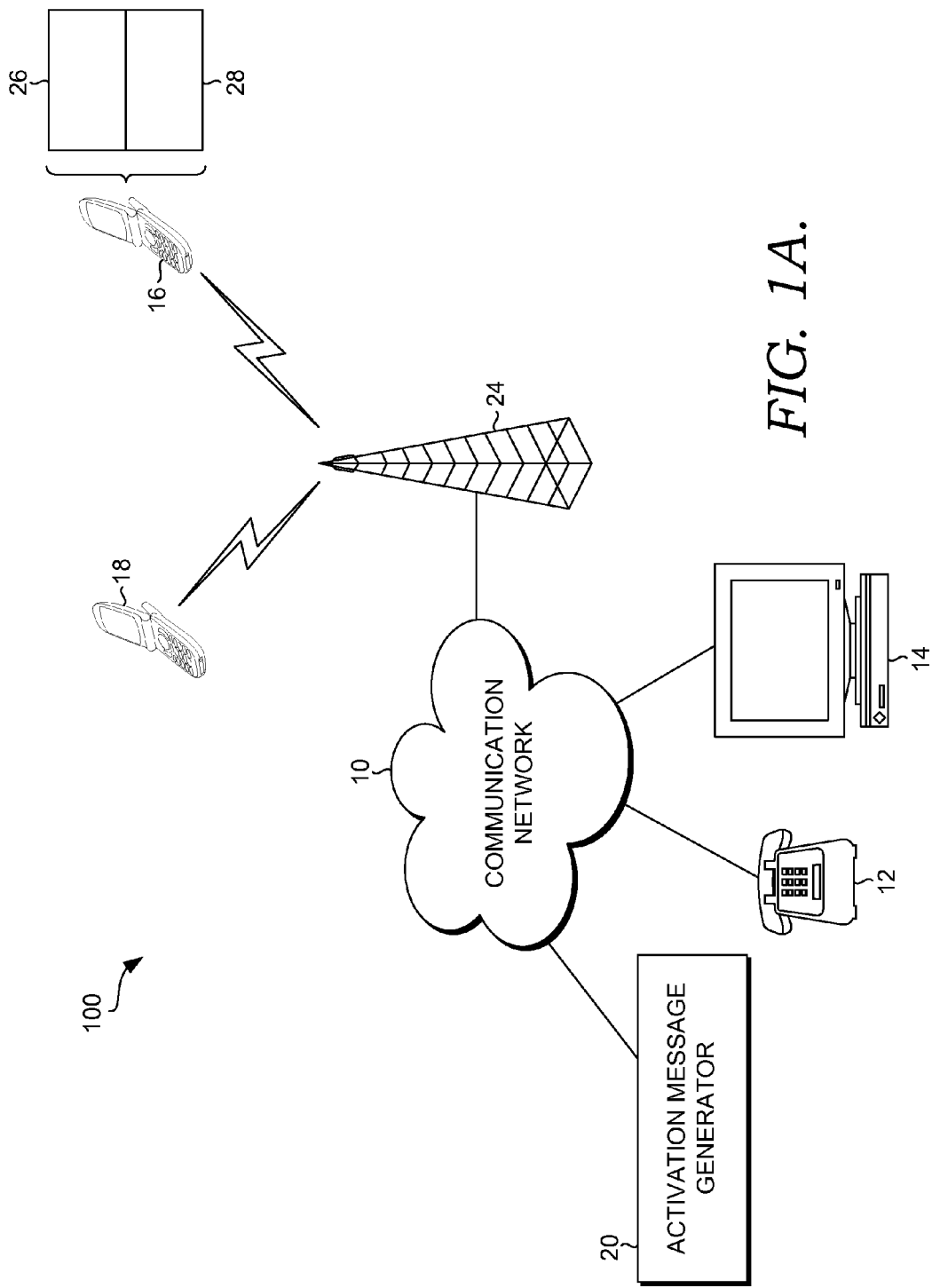
FIG. 1A is a diagram depicting a first illustrative network suitable for practicing an embodiment of the present invention.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

BSC Base Station Controller
BTS Base Transceiver Station
CDMA Code Division Multiple Access
CD-ROM Compact Disk Read Only Memory
CMS Call Management Server
EEPROM Electrically Erasable Programmable Read Only Memory
GSM Global System for Mobile Communications
GPRS General Packet Radio Service
HLR Home Location Register
HSS Home Subscriber Server
MMS Multimedia Messaging Service
PDA Personal Digital Assistant
RAM Random Access Memory
ROM Read Only Memory TDMA Time Division Multiple Access Further, various technical terms are used throughout this description. A definition of such terms can be found in Newton's Telecom Dictionary by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and non-removable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1B:
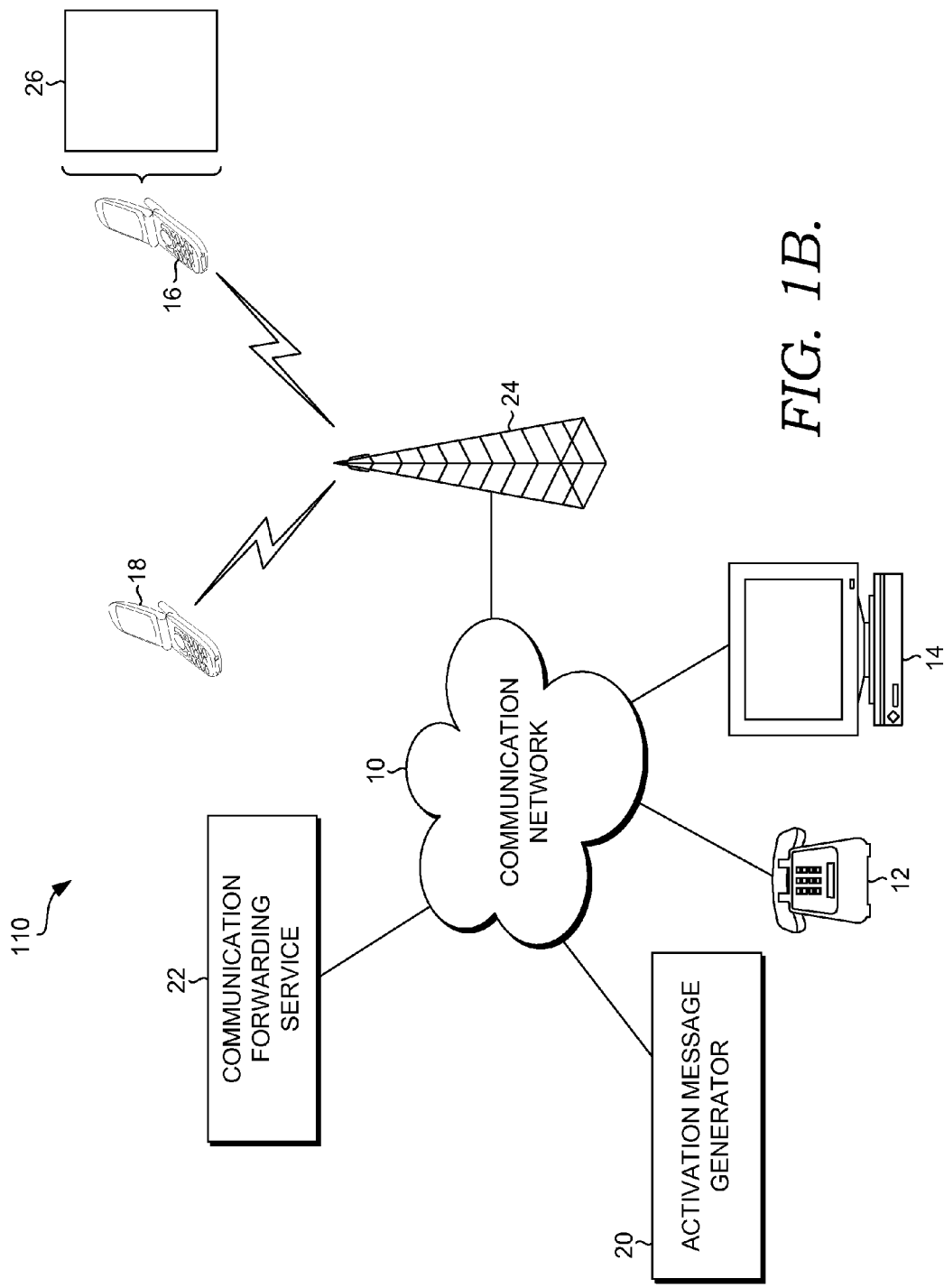
FIG. 1B is a diagram depicting a second illustrative network suitable for practicing an embodiment of the present invention.

FIGS. 1A and 1B depict illustrative environments for performing one or more embodiments of the present invention. It is important to note that network environments in which embodiments of the present invention may operate may be arranged in a variety of configurations, and the network environment 100 of FIGS. 1A and 1010 of FIG. 1B provides only two exemplary network environments.

The illustrative environments include a communication network 10. The communication network 10 may include one or more mobile networks, one or more packet based networks, including the Internet, and the public switched telephone network (PSTN). The various components within the communication network 10 may be owned, and/or operated by, multiple entities, commercial or otherwise. The communication network 10 is configured to transmit a variety of communication formats including phone calls, emails, text messaging, faxes, instant messaging, pages, voice mails, photographs, audio files, movies, TV shows, calendar reminders, task reminders and other files containing communicative content. The communication network 10 is adapted to carry these communication formats between a variety of communication devices including, phones, computers, mobile phones, PDA's, pagers, servers computers, client computers, and fax machines. The lists of communication devices and communication formats is not exhaustive and other devices and communication formats could be compatible with, or carried on, the communication network 10 and be compatible with the illustrative environments.

As stated, the communication network 10 may include one or more wireless networks that may be operated by one or more wireless service providers. The wireless network allows mobile-communication device 16 to communicate with other mobile communication devices, such as second mobile-communication device 18, and with other communication devices connected to the communication network 10. The wireless network connects to mobile communication devices through base station 24. The base station 24 is connected to the communication network 10. Only one base station is shown, and without its many components, for the sake of clarity. One having ordinary skill in the art understands that a mobile communication device could be in simultaneous communication with multiple base stations.

Standard air interface protocols, such as code division multiple access ("CDMA"), global system for mobile communications ("GSM"), or time division multiple access ("TDMA"), as well as others, may be used by the base station to communicate with the mobile-communication device 16, and/or the second mobile-communication device 18. Other network communication interface arrangements are also possible. A base station controller (not shown) is responsible for handling traffic and signaling between the mobile-communication device 16, and/or the second mobile-communication device 18 and the base station 24. A mobile switching station carries out the switching functions, and a soft switch connects a call to other mobile-communication devices or to the PSTN.

The mobile-communication device 16, and the second mobile-communication device 18 are wireless terminals that are adapted to receive communications over the wireless networks included in communication network 10. The mobile-communication device 16, and the second mobile-communication device 18 may include a bus (not shown) that directly or indirectly couples the following devices: memory (not shown), one or more processors (not shown), one or more presentation components (not shown), input/output (I/O) ports (not shown), I/O components (not shown), and a power supply such as a battery. The mobile-communication device 16, and the second mobile-communication device 18 may use standard air interface protocols, such as code division multiple access ("CDMA"), global system for mobile communications ("GSM"), or time division multiple access ("TDMA"), as well as others, to communicate with the base station 24. Other network communication interface arrangements are also possible.

The mobile-communication device 16, and the second mobile-communication device 18 may take any of a variety of forms. By way of example, the mobile-communication device 16, and the second mobile-communication device 18 may be a mobile telephone, a pager, a computer, a personal digital assistant ("PDA") or any combination of these or other devices. The mobile-communication device 16, and the second mobile-communication device 18 may be configured to receive and/or convey information such as voice and data (e.g., fax, e-mail and other text messages) and/or other media (e.g., audio, video and graphics). Further, the mobile-communication device 16, and the second mobile-communication device 18 may include input and output facilities such as a touch-pad, a keyboard, a camera, a display, a microphone and/or a speaker. The mobile-communication device 16, and the second mobile-communication device 18 may be equipped with web browsing software to allow subscribers to communicate with web servers over an Internet Protocol (IP) network (i.e., the Internet). The mobile-communication device 16, and the second mobile-communication device 18 may be configured to receive, by way of example and not limitation, telephone calls, emails, text messages, pages, pictures, video, TV shows, radio, music, calendar reminders, and other files with communicative properties.

For the sake of illustration, throughout this disclosure the mobile-communication device 16 is the device on which embodiments of the present invention are practiced. Second mobile-communication device 18 is illustrative of devices that could be used to communicate with the activation-message generator 20 or be a designated receiver of forwarded communications.

With reference to FIGS. 1A and 1B, the mobile-communication device 16, includes an activation application 26. The mobile communication device 16 of FIG. 1A also includes a forwarding application 28. These applications will be described in more detail in subsequent paragraphs. Though shown separately in FIG. 1A to illustrate function, the activation application 26, and the forwarding application 28 may be installed, or operated, as a single application. Similarly, the activation application 26, and the forwarding application 28 may be broken down into smaller application modules or incorporated in part, or in whole, into a operating system on the mobile-communication device 16 and still fall within the scope of this invention.

With continued reference to FIGS. 1A and 1B, the communication network 10 includes a packet based network including the Internet. The operation of a packet based network, and components within a packet based network, are well understood to those having ordinary skill in the art, thus are not explained in detail herein. The computing device 14 may access the communications network 10 through a network interface or a modem. The computing device 14 may be connected to the communication network 10 via a telephone line, cable, satellite, a wireless connection or other means. The computing device 14 may have a static or dynamic IP address.

The communication network 10 includes the PSTN. The telephone 12 is connected to the PSTN through a telephone line. The operation of telephones and their interaction with the PSTN is well understood by those having ordinary skill in the art.

The activation-message generator 20 is an application that is connected to or resides on the communication network 10. The activation-message generator 20 generates and sends activation messages to the activation application 26 on mobile communication device 16. The activation message may contain instructions to activate or deactivate a communication-forwarding function. The activation-message generator 20 may be configured to receive information from a variety of sources, including, but not limited to, a telephone, a computing device, a mobile phone, and a PDA. The activation-message generator 20 may also be configured to receive a variety of communication types, including, but not limited to a phone call, email, or a data file. The function of the activation-message generator 20 will be described in more detail in subsequent paragraphs.

Referring now to FIG. 1B, the forwarding service 22 is an application that is connected to or resides on the communication network 10. The forwarding service 22 may be provided by a mobile communication service provider and operates to redirect communications utilizing the service provider's network resources. The forwarding service 22 operates apart from communication devices, such as the mobile-communication device 16. In one embodiment, the forwarding service 22 is a call-forwarding service operated by a mobile communication service provider. Possible communication types that could be forwarded by a forwarding service operated by a service provider include phone calls, text messages, pages, picture, and video files.

With reference to FIG. 1A, the telephone 12, computing device, and second mobile communication device 18 may communicate over network 10 with the activation message generator 20 and request that the activation message generator 20 activate a communication-forwarding function for mobile communication device 16. The activation message generator 20 may send an activation message over network 10 to the activation application 26 located on the mobile communication device 26. The activation application 26 in turn activates the forwarding application 28.

With reference to FIG. 1B, the telephone 12, computing device, and second mobile communication device 18 may communicate over network 10 with the activation message generator 20 and request that the activation message generator 20 activate a communication-forwarding function for mobile communication device 16. The activation message generator 20 may send an activation message over network 10 to the activation application 26 located on the mobile communication device 26. The activation application 26 may in turn communicate with the forwarding service 22 for the purpose of activating it.

Though FIG. 1A is shown without the forwarding service 22 and FIG. 1B is shown without the forwarding application 28 it should be understood that an suitable illustrative environment could contain both a forwarding service 22 and forwarding application 28. The two communication forwarding functions may coexist and function concurrently. They are shown separately only for the sake of clarity.

Embodiments of the present invention provide a system and method for remotely activating communication-forwarding functions for a mobile communication device 16. In one embodiment, a forwarding service 22 operated by a provider of mobile communication services may be remotely activated. In a second embodiment, a forwarding application 28 residing on a mobile communication device 16 may be remotely activated. Embodiments of the present invention have several practical applications in the technical arts including allowing a user of a mobile communication device 16 to activate a communication-forwarding function for the device when the user does not have possession of his or her mobile communication device 16.

Figure 2:
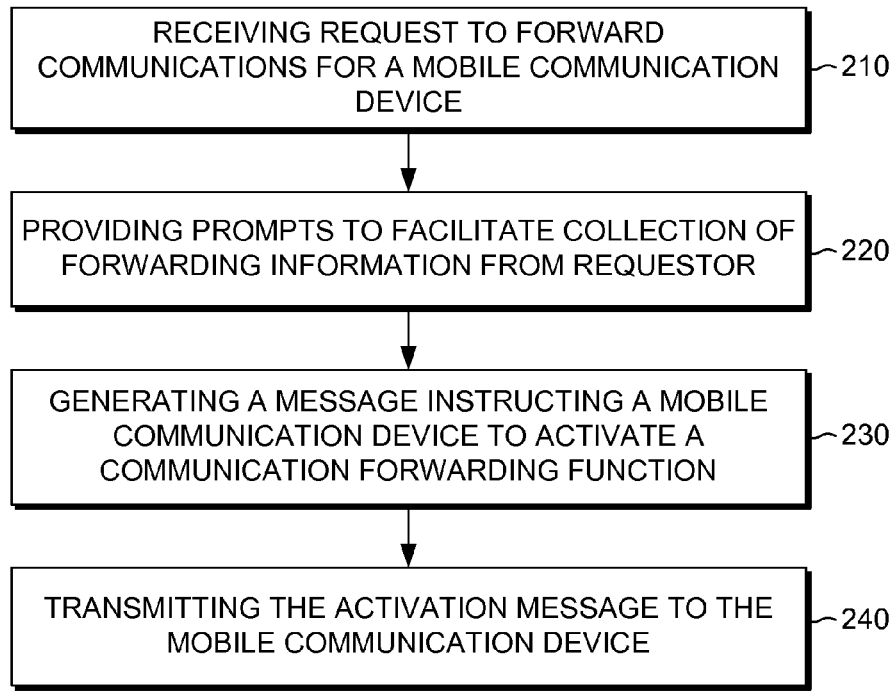
FIG. 2 is a flow chart that depicts a method of remotely activating a network's call forwarding service from a mobile-communication device.

With reference to FIG. 2, a method for remotely activating a communication forward function is shown. Two different communication-forwarding functions may be activated by the method described in FIG. 2. The two types of communication-forwarding functions that may be activated are a forwarding service 22 or a forwarding application 28. The forwarding service 22 may be any service including, but not limited to, a call-forwarding service operated by a provider of mobile phone services. Typically, a call-forwarding service may only be activated by calling the service provider from the mobile communication device 16 from which calls are to be forwarded. Embodiments of the present invention allow a user to activate a communication forwarding function, when the user does not have possession of the mobile communication device 16.

At step 210, a request to forward communications from the mobile communication device 16 to a second device is received by the activation-message generator 20. The request is made with a device other than the mobile communication device 16 from which calls are to be forwarded. Examples of such devices include, a telephone 12, a second mobile communication device 18, or a computing device 14.

At step 220, the activation-message generator 20 may provide prompts to facilitate the acquisition of information that is needed to generate an activation message. These prompts may be in the form of voice prompts if the activation-message generator 20 is communicating with a device configured to receive voice data. Examples of such devices include a telephone 12, or second mobile communication device 18. The prompts could also be a form provided on a webpage or an email template if the activation-message generator 20 is communicating with a computing device 14, or the second mobile communication device 18.

The activation message generator may use prompts to request the phone number or IP address of the mobile communication device 16 from which communications are to be forwarded. Similarly, the activation message generator 20 may request information about the forwarding-destination device, including a phone number, IP address or a voicemail address. In some instances, the activation message generator 20 may gather information about the communication forwarding function that is to be activated. The activation message may instruct the activation application 26 on the mobile communication device to activate either the forwarding service 22, or the forwarding application 28, or a combination of the two. For example, if a forwarding application 28 is resident on mobile communication device 16, and a forwarding service 22 is available, the activation message generator 20 may ask the user to select one of the two communication-forwarding functions. On the other hand, if only one of the two possible communication-forwarding functions were available the activation message generator 22 may not need to request information about the communication forwarding service.

In addition to selecting which combination of communication-forwarding functions are to be activated, the activation message generator 20 may also gather information about specific communication-forwarding functions. For example, the activation message generator 20 may use a prompt to request contact information for a forwarding service 22. Though in a preferred embodiment, the activation message generator 20 knows the forwarding service's 22 contact information and activation procedures. These are just a few examples of information that the activation message generator 20 may gather through prompts, and are not intended to be limiting. Any, and all, information that may be required to generate an activation message may be requested by the activation message generator 20.

At step 230, in response to the request received, the activation-message generator 20 generates an activation message that is configured to instruct the mobile communication device 16 to activate or deactivate a communication-forwarding function. The activation message is generated using the information provided by the requestor in step 220.

In one embodiment, the activation message generator 22 authenticates the user, prior to transmitting the activation message to the mobile communication device 16. Authentication may be through the use of a password or pin. Additionally, the activation application 26 may be programmed to only forward communications to pre-approved forwarding destinations. Similarly, the activation-message generator 22 may be programmed to only generate instructions that forward communications to pre-approved forwarding destinations. The examples of authentication, provided above, are not exhaustive and other authentication methods may be used.

At step 240, the activation-message generator 20 then transmits the generated activation message to the mobile communication device 16. The activation message may be sent in a number of forms including a SMS or WAP push type message. Generally, any suitable format may be used by the activation-message generator 20 to communicate with the mobile communication device 16. The activation message is received and recognized by the activation application 26 operating on mobile device 16.

Figure 3:
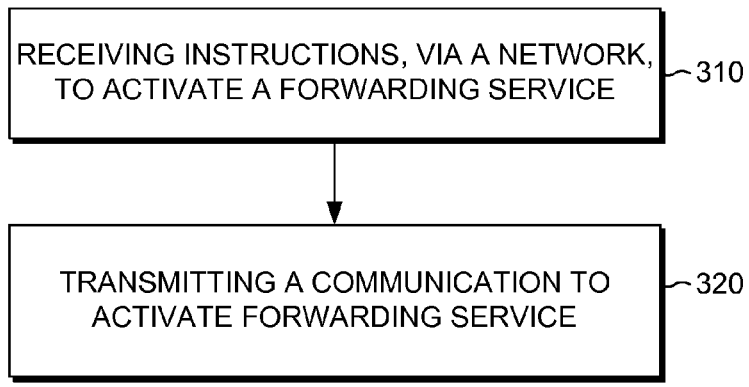
FIG. 3 is a flow chart that depicts a method of remotely activating a communication forwarding function operated by a mobile-communication device, and forwarding the communications.
Figure 4:
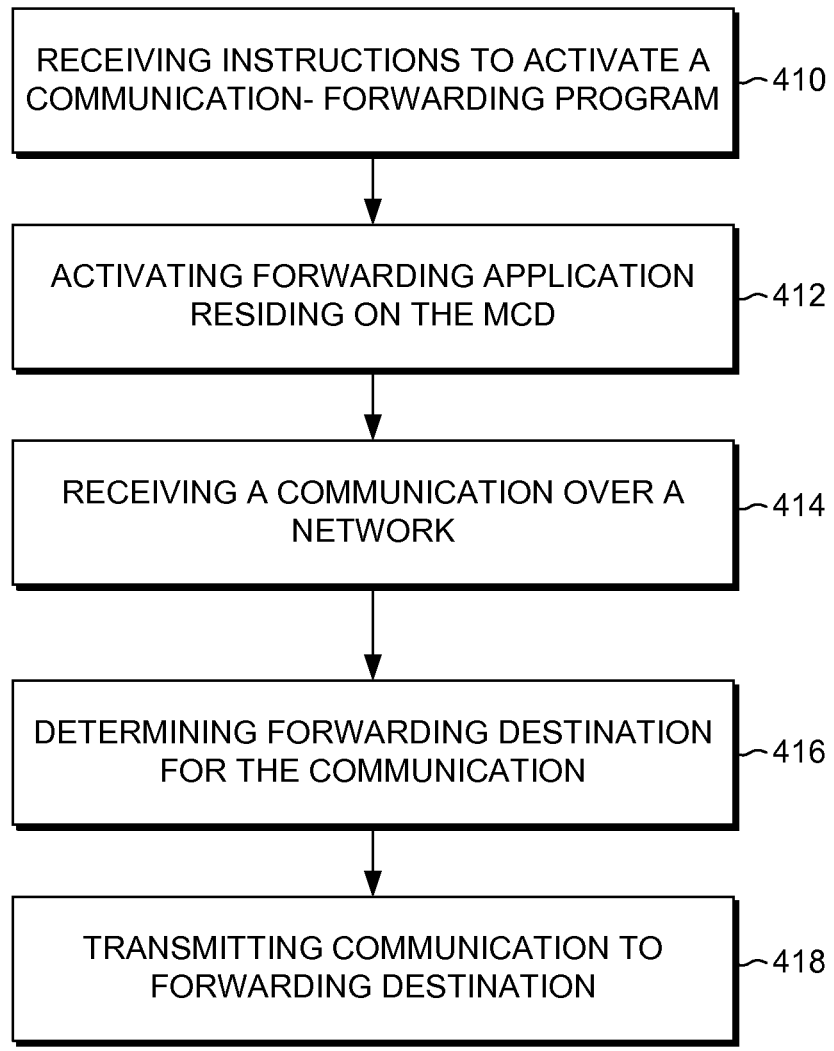
FIG. 4 is a flow diagram that depicts a method of generating a message that instructs a mobile communications device to activate communication forwarding.

Turning now to FIGS. 3 and 4, once the activation message has been received by the activation application 26 residing on mobile communication device 16, it activates one of two communication forwarding functions. The activation message may instruct the activation application 26 to activate the forwarding service 22, shown on FIG. 1B, or activate the forwarding application 28 on the mobile communication device 16 shown in FIG. 1A. As described above the activation message could instruct the activation application to activate one or both of the forwarding service 22 and the forwarding application. Additionally, a default setting could be used causing the activation application 26 to always activate one of the communication-forwarding functions.

With reference to FIG. 3, a method of activating a forwarding service operated by a provider of mobile communication services is provided. This method allows a user to activate a forwarding service 22 while the user does not have possession of the mobile communication device 16, from which communications are to be forwarded. At step 310, the activation application 26 on the mobile-communication device 16 receives an activation message over a wireless network with instructions to activate a forwarding service 22. The wireless network, as described previously, is part of communication network 10 and is used to communicate with mobile communication device 16. As stated, the activation message is sent by the activation generator 20 and may be sent in a number of forms including a SMS or WAP push type message.

At step 320, the activation application 26 communicates with the service-provider and activates the forwarding service 22. The activation application 26 may activate the forwarding service 22 by placing a telephone call to the service provider, sending a data stream including an SMS, WAP push, email, or text message to the provider of the forwarding service 22. In one embodiment, the activation application 26 communicates with the forwarding service by placing a phone call to the forwarding service's activation number. In some instances, the contact information for the forwarding service (such as phone #, email address, IP address, etc.) is predefined in the activation application 26 and in some instances provided by the activation message. The forwarding service 22 may have the capability to forward telephone calls, text messages, emails, etc.

Several methods are available to deactivate the forwarding service 22. In a preferred embodiment, the user communicates with the activation-message generator 20 that generates a deactivation message and send it to the activation application 26 on the mobile-communication device 16. In response to the deactivation message, the activation application 26 communicates with the forwarding service 22 and deactivates it. The user may also deactivate the forwarding service 22 by initiating a communication from the mobile-communication device 16 if they have possession of the mobile-communication device 16.

The activation application 26 may be adapted to track whether a forwarding service 22 is active for the mobile communication device 16. The activation application 26, may then provide an indication on the mobile-communication device 16 that a forwarding service is active. The indication may be on a display or an LED on the mobile communication device 16. The indication could also be audible or a vibration. Any other form of indication could generally to used. The indication may be turned off manually.

With reference to FIG. 4, a method of activating and operating a forwarding application 28 residing on the mobile communication device 16 is provided. This method allows a user to activate a forwarding application 28 while the user does not have possession of the mobile communication device 16, from which communications are to be forwarded. At step 410, the activation application 26 on the mobile communication device 16 receives an activation message with instructions to activate a forwarding application. As stated, the activation message is sent by the activation message generator 22 in a number of possible forms including a SMS or a WAP push type message.

At step 412, the activation application 26 activates a forwarding application 28 that operates on the mobile device. The forwarding application 28 is adapted to forward a variety of communication types to one or more communication devices, in accordance with the instructions contained in the activation message. The communication devices to which a communication may be forwarded include a telephone 12, a computing device 14, or a second mobile-communication device 18. The forwarding application 28 may be remotely activated through an activation message generated by the activation-message generator 20, as described in step 412, or manually through an input device on the mobile communication device 16. Once the forwarding application 28 is activated, the mobile communication device 16 forwards received communications to one or more communication devices.

At step 414, the mobile communication device 16 receives a communication over a wireless network. At step 416, the mobile communication device 16 determines the forwarding destination for the communication. As described previously, the forwarding destination could be provided in the activation message. However, data, such as a contact list or address book, stored on the mobile-communication device 16 may be used to determine the forwarding destination. A default setting on the forwarding application 28 could also be used to determine the forwarding destination.

At step 418, the mobile communication device 16 transmits the received communication to the forwarding destination. The forwarding application 28 may forward different communication types to different forwarding destinations. Communication types that may be forwarded by the forwarding application 28 include phone calls, emails, instant messages, text messages, pictures, video messages, voice mail indications, meeting notifications, task reminders, or any other message with communicative content that the mobile communication device 16 can be adapted to receive. By way of example, and not limitation, the forwarding application could forward a phone call to telephone 12, and an text message to computing device 14.

The activation application 26 may be adapted to track whether the forwarding application 28, is active for the mobile communication device 16. The activation application 26, may then provide an indication on the mobile communication device 16 that a forwarding application is active. The indication may be on a display or an LED on the mobile-communication device 16. The indication could also be audible or a vibration. Any other form of indication could generally to used.

Several methods are available to deactivate the forwarding application 28. In one embodiment, the user communicates with the activation-message generator 20 that generates a deactivation message and sends it to the activation application 26 on the mobile-communication device 16. In response to the deactivation message, the activation application 26 deactivates the forwarding application 28. The user may also deactivate the forwarding application 28 by entering data on an input device, such as the keypad, on the mobile communication device 16 if they have possession of the mobile communication device 16

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described

The invention claimed is:

1. One or more non-transitory computer-storage media having computer-useable instructions embodied thereon for allowing a mobile communication device to perform a method activating communication-forwarding functions for the mobile communication device, the method comprising:
   receiving an activation message with instructions to forward a text message that is addressed to the mobile communication device to a second communication device and a telephone call that is addressed to the mobile communication device to a third communication device, wherein the activation message is received by the mobile communication device via a wireless signal, and wherein the activation message is generated by an activation-message generator that provides an interface that uses prompts to request information needed to generate the activation message; and
   in response to the activation message, activating a communication-forwarding application that runs on the mobile communication device and forwards text messages received by the mobile communication device to the second communication device and activating a communication-forwarding service that forwards telephones calls addressed to the mobile communication device to the third communications device, wherein the communication-forwarding service is operated apart from the mobile communication device, and wherein the communication-forwarding service is activated by the mobile communication device placing a call, without user intervention, to the communication-forwarding service.

2. The media of claim 1, wherein the mobile communication device includes one or more of the following:
   a personal data assistant;
   a mobile phone; and
   a pager.

3. The media of claim 1, wherein the activation message identifies the second communication device to which the text message is to be forwarded.

4. The media of claim 1, the method further comprising:
   receiving an instruction to deactivate the communication-forwarding service; and
   without user intervention, deactivating the communication-forwarding service.

5. The media of claim 1, the method further comprising:
   communicating an indication that the communication-forwarding service is active for the mobile communication device, wherein the indication is communicated by the mobile communication device through the mobile device's user interface.

6. One or more non-transitory computer-storage media having computer-useable instructions embodied thereon for performing a method that allows a mobile communication device to forward communications, the method comprising:
receiving an activation message, wherein the activation message is received by the mobile communication device, and wherein the activation message specifies a first forwarding destination for emails and a second forwarding destination for telephone calls;
in response to the activation message, activating a communication-forwarding function performed by the mobile communication device, wherein the communication-forwarding function forwards different communication types to different forwarding destinations;
receiving an email directed to the mobile-communication device over a wireless network;
determining the first forwarding destination is designated for the email;
without user intervention, forwarding the email to the first forwarding destination;
receiving a telephone call directed to the mobile-communication device over a wireless network;
determining the second forwarding destination is designated for the telephone call; and
without user intervention, forwarding the telephone call to the second forwarding destination.

7. The media of claim 6, wherein the activation message is of a type that includes one or more of the following:
SMS; and
WAP push.

8. The media of claim 6, the method further comprising:
receiving an instruction to deactivate the communication-forwarding function; and
without user intervention, deactivating the communication-forwarding function.

9. The media of claim 6, wherein the activation message includes the first and the second forwarding destinations.

10. One or more non-transitory computer-storage media having computer-useable instructions embodied thereon for instructing a mobile communication device to forward communications, the method comprising:
providing prompts on a user interface to facilitate acquisition of information that is needed to generate an activation message that instructs a mobile communication device to activate a communication-forwarding function;
in response to the prompts, receiving the information through the user interface;
receiving a request through the user interface to instruct the mobile communication device to activate the communication-forwarding function;
generating an activation message configured to instruct the mobile communication device to activate the communication-forwarding function that forwards telephone calls to a first destination and text messages to a second destination;
without user intervention, transmitting the activation message to the mobile communication device;
receiving a text message directed to the mobile-communication device over a wireless network;
determining the second destination is designated for the text message;
without user intervention, forwarding the text message to the second destination:
receiving a telephone call directed to the mobile-communication device over a wireless network;
determining the first destination is designated for the telephone call; and
without user intervention, forwarding the telephone call to the first destination.

11. The media of claim 10, wherein the activation message includes the first destination and the second destination.

12. The media of claim 10 wherein the activation message is of a type that includes one or more of the following:
SMS; and
WAP push.

13. The media of claim 10 wherein the request is received from a communication device including one or more of:
a mobile communication device;
a telephone; and
a computing device.

14. The media of claim 10 wherein the activation message instructs the mobile communication device to activate a communication-forwarding function including one or more of the following:
a forwarding service operated by a service provider; and
a forwarding application operated by the mobile communication device.

* * * * *